United States Patent [19]
Scwab

[11] Patent Number: 5,134,193
[45] Date of Patent: Jul. 28, 1992

[54] LOW DENSITY POLYETHYLENE CONTAINING CHEMICALLY BONDED CHROMOPHORES AS UV PRODEGRADANTS

[75] Inventor: Frederick C. Scwab, Metuchen, N.J.

[73] Assignee: Mobil Oil Corporation, Fairfax, Va.

[21] Appl. No.: 388,419

[22] Filed: Aug. 2, 1989

[51] Int. Cl.⁵ .................. C08L 23/04; C08L 23/26; C08L 23/28; C08L 23/36
[52] U.S. Cl. ...................... 525/57; 525/61; 525/193
[58] Field of Search .............. 525/57, 193, 211, 240

[56] References Cited

U.S. PATENT DOCUMENTS

| | | | |
|---|---|---|---|
| 3,645,939 | 2/1972 | Gaylord | 525/57 |
| 3,857,754 | 12/1974 | Hirata et al. | 525/57 |
| 4,093,678 | 6/1978 | Bailey et al. | 526/169 |

FOREIGN PATENT DOCUMENTS 2316697 10/1973 Fed. Rep. of Germany .
49-051341 5/1974 Japan .

Primary Examiner—Carman J. Seccuro
Attorney, Agent, or Firm—Alexander J. McKillop; Charles J. Speciale; Marina V. Schneller

[57] ABSTRACT

Polyethylene modified to contain chromophores which absorb at greater than 200 nm. are used to accelerate the degradaton of polyethylene on exposure to ultraviolet radiation.

15 Claims, No Drawings

LOW DENSITY POLYETHYLENE CONTAINING CHEMICALLY BONDED CHROMOPHORES AS UV PRODEGRADANTS

FIELD OF THE INVENTION

Polyethylene copolymers are modified to contain chromophoric moieties such as para-substituted benzenes and anthracene derivatives chemically bonded thereto. This invention relates to compositions comprising a linear polymer of ethylene such as high density polyethylene or linear low density polyethylene copolymers (LLDPE) and copolymers of ethylene containing chromophoric groups which absorb at a wavelength higher than about 200 nm. The modified polyethylenes were effective prodegradants when added in small amounts to LLDPE.

BACKGROUND OF THE INVENTION

Polyethylene is used in packaging and disposable service ware associated with the food packaging and fast-food service markets. In these applications, it can be desirable to provide the polyethylene as a composition which is photodegradable.

The current emphasis on ecology and, in particular, the disposal of bulk rubbish, is in part directed to coping with the tremendous increases in the use of plastic containers and plastic films for packaging foodstuffs, and containing garbage and the like which not only present a serious disposal problem but increase unslightly litter in picnic areas, on roadsides and the like.

It is generally recognized that certain polyolefins such as polypropylene and polyethylene are photodegradable when exposed to ultraviolet light. Nevertheless, unlike steel containers which will rust away relatively rapidly, the actual decomposition of polyolefins is relatively slow and hence despite some discoloration and/or embrittlement when exposed to sunlight these plastic materials tend to remain substantially intact for relatively long periods of time.

SUMMARY OF THE INVENTION

The invention relates to a composition of matter comprising photodegradable polyethylene and to a method for accelerating the degradation of polyethylene on exposure to ultraviolet light.

The present invention relates to a polyethylene composition in film or package form which has been modified to render it more readily decomposable on exposure to ultraviolet light.

The present invention also includes food wrapped or contained in films or packing materials formed from polyethylene modifies in accordance with the invention.

DETAILED DESCRIPTION OF THE INVENTION

The invention relates to a composition of a linear polymer of ethylene and an amount of a modifying copolymer of ethylene containing chromophoric groups which absorb at a wavelength higher than about 200 nm, as an ultraviolet degradant accelerator. These ethylene modifying copolymers are to be distinquished from those ethylene copolymers containing carbonyl compounds which absorb at about 200 nm., sold by Union Carbide and Dupont The ultraviolet degradant accelerator can be introduced into the composition in any convenient manner, such as by direct addition or by introduction with a master batch containing an ethylene polymer and a higher concentration of the accelerator. The master batches then can be diluted with additional virgin ethylene polymer to achieve the necessary concentration in the composition as disclosed herein.

The ultraviolet degradant accelerator used in accordance with the invention comprises a polymer or copolymer which has been chemically modified to contain chromophores which absorb at a wavelength higher than about 200 nm. In embodiments below that polymer is a copolymer of ethylene. The ethylene copolymer is modified to contain aromatic moieties which act as chromophores. The aromatic moiety can be any ortho, meta, or para substituted benzene, substituted naphthalene or anthracene. The benzene, naphthalene or ANTHRACENE can be mono, di or tri substituted. In accordance with the invention those chromophores can be substituted benzene, unsubstituted or substituted naphthyl or anthracyl radicals. Preferably the chromophores are para-substituted benzene(s) and anthracene derivatives. In the chromophoric groups, the aromatic substituents are selected from the group consisting of nitro—, $-SO_x$, —CN, —Cl, COOH, —C(O)R and —OR, wherein R is an alkyl of 1 to 5 carbon atoms (e.g., methyl ethyl, propyl, isopropyl, butyl, isobutyl, t-butyl, pentyl, isopentyl, 2-methylbutyl, 3-methyl butyl, 2,2-dimethylpropyl, 3,3-dimethyl propyl). Chemical modification of the copolymer is undertaken by providing the copolymer with reactive groups. For example, the copolymer used in the examples contains —OH groups resulting from the hydrolysis of acetate groups in an ethylene -vinyl acetate copolymer; however, the reactive groups on the copolymer, prior to reaction with the chromophore can be hydroxyl, carbonyl, carboxyl, or amino. The resulting —OH groups provide reactive sites for react with derivatives of the benzene containing those aforementioned para-substituents. The reactive groups on the benzene or anthracene derivative can be an hydroxyl, carboxylate, amino or an amide; and the reactive group can be converted to the reactive chloride derivative by treatment with $SOCl_2$, and $PCl_5$ or to an anhydride.

The amount of the ultraviolet degradant accelerator can range from about 0.01 to about 10 weight percent based on the total weight of the composition.

The ethylene polymer, to be rendered more susceptible to ultraviolet irradiation, can be a high density polymer of ethylene or a linear low density polymer of ethylene. Linear low density ethylene polymer is a copolymer of ethylene and a higher olefin and contains a sufficient amount of the higher olefin so that the copolymer has a density in the range of about 0.90 to about 0.94, preferably 0.91 to 0.93. The higher olefin is commonly 1-butene, 1-hexene, 4-methyl-1-pentene or 1-octene. Such materials are disclosed in U.S. Pat. No. 4,076,698 which is incorporated herein by reference in its entirety, and are widely available.

The composition of the invention can also contain conventional ingredients, such as fillers, antioxidants, stabilizers and the like.

These compositions of the invention can be used as films, as skins on other biodegradable or photodegradable substrates or as packages per se which contain food. They may be fabricated as films or as packages by techniques known in the art.

The invention will be illustrated by the following examples.

EXAMPLES

Example 1

Two grams of an ethylene-vinyl alcohol copolymer (3% vinyl alcohol), made by hydrolyzing a 3% vinyl acetate EVA copolymer, was dissolved in 20 ml toluene in a 2 oz. bottle and dissolved at 70° C. under nitrogen. A quantity of 0.30 gm of p-nitrobenzoyl chloride was added with about 0.1 ml of pyridine (acid scavenger). The product was reacted for 16 hours at 70° C. and precipitated in MEOH with a yield of about 98%.

The material was added in small amounts to a barefoot (unstabilized) LLDPE in a Brabender at 185° C., molded and exposed to UV radiation for 200 hours in a QUV Weather-O-Meter.

| Time, Hrs | P-Nitro Content (%) | | | |
|---|---|---|---|---|
| | 0 | 0.25 | 0.50 | 0.75 |
| 0 | 100 | 100 | 100 | 100 |
| 50 | 100 | 66 | 60 | 43 |
| 100 | 89 | 65 | 55 | 47 |
| 150 | 100 | 55 | 47 | 37 |
| 200 | 73 | 58 | 50 | 43 |

% Elongation Retained

Example 2

Ten grams of an ethylene-acrylic acid copolymer (10% acrylic acid) was dissolved at 75° C. in 100 ml toluene in a 250 ml reactor. Then 1 ml thionyl chloride was added and reacted 3 additional hours. Thereafter, 2.9 grams 9-anthracene-methanol and 1 ml pyridine were added and allowed to react for two hours at 70° C. The product was precipitated into methanol. A small amount was melt blended in an unstabilized LLDPE resin and then exposed to UV for 200 hours.

| Time, Hrs | Anthracene Content, % | |
|---|---|---|
| | 0 | 0.125 |
| 0 | 100 | 100 |
| 50 | 100 | 49 |
| 100 | 100 | 15 |
| 150 | 79 | 7 |
| 200 | 41 | 7 |

% Elongation Retained

Examples 3-5

In accordance with the chemistry described in Example 1, three examples of hydrolyzed EVA were modified with three (3) other chromophoric moieties respectively:

p-cyanobenzoyl chloride
p-methoxybenzolyl chloride
p-chlorobenzoyl chloride

The UV test results on the above derivatives are as follows:

| Exposure Time Hours | p-Cyano | | | p-Chloro | | p-Methoxy | |
|---|---|---|---|---|---|---|---|
| | 0 | 0.5 | 0.75 | 0.5 | 0.75 | 0.5 | 0.75 |
| 0 | 100 | 100 | 100 | 100 | 100 | 100 | 100 |
| 50 | 85 | 82 | 82 | 75 | 71 | 78 | 73 |
| 100 | 90 | 49 | 18 | 21 | 29 | 10 | 16 |
| 150 | 76 | 30 | 15 | 6 | 11 | 7 | 4 |
| 200 | 76 | 12 | 9 | 10 | 8 | 6 | 9 |

% Elongation Retained
Base Resin: MJA-042 (Butene LLDPE)

In accordance with the invention, highly effective low molecular weight chromophores can be chemically attached to polyethylene, thus preventing extraction and migration. These aromatic chromopores absorb at higher wavelengths, and thus are more effective than carbonyls.

Although the present invention has been described with respect to preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for accelerating the degradation of linear polyethylene on exposure to light comprising providing an ethylene copolymer with reactive groups, reacting said copolymer with a chromophore to produce a chemically modified copolymer which contains chromophores absorbing at greater than 200 nm, and compounding said chemically modified copolymer with said linear polyethylene in an amount effective to accelerate the degradation of the polyethylene on exposure to ultraviolet light,
   wherein said chromophore is a derivative of benzene or anthracene unsubstituted or ring substituted by a substituent selected from the group consisting of nitro, —CN, —SO$_x$, —Cl, —COOH, —OR and —C(O)R, wherein R is alkyl of 1 to 5 carbon atoms; and exposing the compounded linear polyethylene to ultraviolet light.

2. The process of claim 1, wherein said chromophore is provided by a derivative selected from the group consisting of p-nitro benzoyl, 9-anthracene-methanol, p-cyanobenzoyl p-methoxybenzoyl, and p-chlorobenzoyl chloride.

3. The process of claim 1, wherein said polymer or copolymer is selected from the group consisting of ethylene-vinyl alcohol or ethylene-vinylacetate copolymers.

4. The process of claim 2, wherein said polymer or copolymer is selected from the group consisting of ethylene-vinyl alcohol or ethylene-vinylacetate copolymers.

5. The process of claim 4, wherein the copolymer is made by hydrolyzing ethylene vinyl acetate copolymer.

6. The process of claim 5, wherein said chromophore is provided by p-nitro benzoyl.

7. The process of claim 5, wherein said chromophore is provided by 9-anthracene-methanol.

8. The process of claim 5, wherein said chromophore is provided by p-cyanobenzoyl.

9. The process of claim 5, wherein said chromophore is provided by p-methoxybenzoyl.

10. The process of claim 5, wherein said chromophore is provided by p-chlorobenzoyl chloride.

11. The method of claim 1 wherein the polyethylene is linear low density polyethylene.

12. The method of claim 1, wherein the polyethylene is high density polyethylene.

13. The method of claim 1, wherein the amount ranges from 0.1 to about 10 weight percent.

14. The method of claim 1, wherein prior to said step of exposing the polyethylene is fabricated into a film.

15. The method of claim 1, wherein prior to said step of exposing the polyethylene is fabricated a container for food.

* * * * *